Oct. 23, 1956
P. C. J. GILSON
2,767,484
DEVICE FOR MEASURING AND REGULATING THE
DRYING OF WET PRODUCTS INSIDE A DRIER
Filed Feb. 14, 1955
5 Sheets-Sheet 4
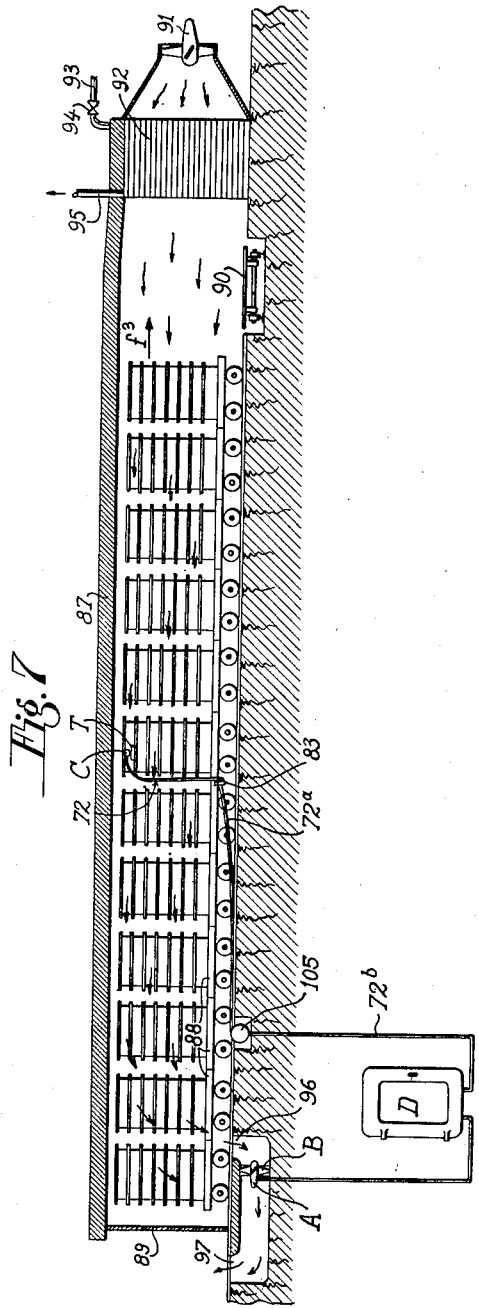
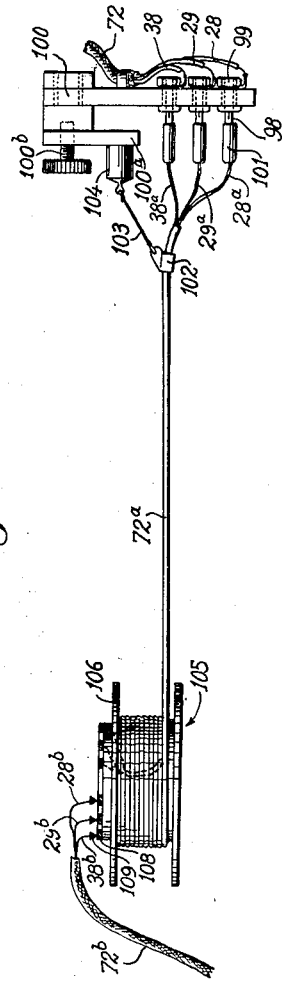

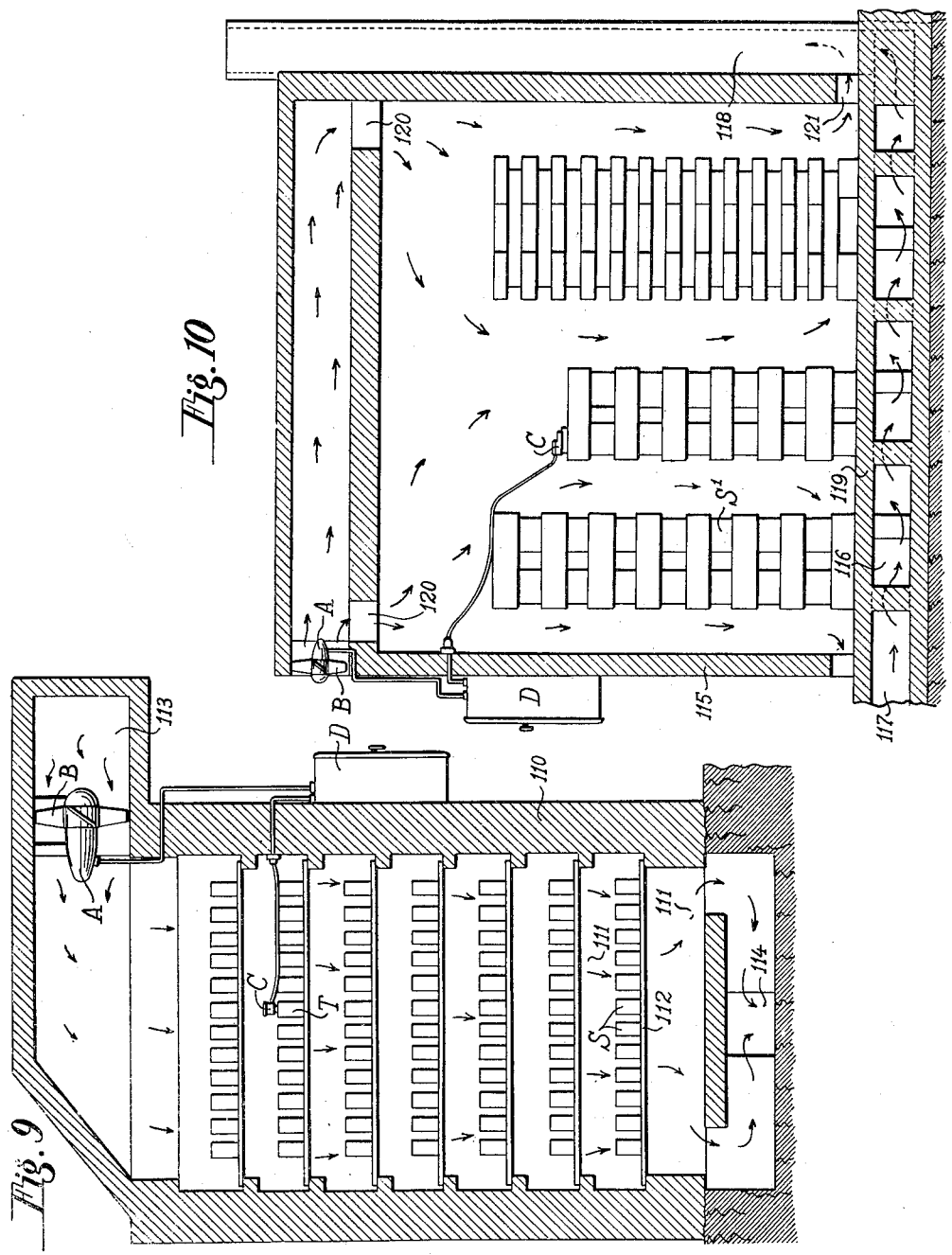

United States Patent Office 2,767,484
Patented Oct. 23, 1956

2,767,484

DEVICE FOR MEASURING AND REGULATING THE DRYING OF WET PRODUCTS INSIDE A DRIER

Pierre Charles Jean Gilson, Campagne-lez-Wardrecques, par Wardrecques, France

Application February 14, 1955, Serial No. 488,100

Claims priority, application France November 9, 1954

16 Claims. (Cl. 34—54)

The present invention relates to drying within a drier wet or moist products such as for example ceramic products of wet or moist clay or pieces of wood.

It is known that each product to be dried requires a certain amount of gaseous fluid, air or other gas, which serves as the vehicle for eliminating the water vapour from the product and, if need be, for bringing this product to a certain temperature. An excess of fluid must be avoided and above all it is necessary to grade with respect to time the flow of fluid in contact with the product so that the drying is effected progressively.

It is well known that if a wet product is dried too suddenly there results an accelerated shrinkage which varies from one part of the product to another and is the cause of internal stresses and splits which deprive the product of a large part of its commercial value.

Furthermore, some time ago it was discovered experimentally that the fragility of the products due to drying is maximum at the start of the drying operation. Certain researches have shown that certain very delicate products (in respect of their dimension, shape or composition) could dry more quickly if the drying operation was effected at a variable rate, for example, rapidly when the product is still soft or plastic and then more slowly when the composition starts to lose its plasticity while undergoing a considerable shrinkage, and finally rapidly when the major part of the water of interposition is eliminated and only colloidal water is left to be evacuated, this being carried out with small shrinkages.

The present invention avoids the disadvantages of known driers in respect of the foregoing observations.

It has notably for an object to provide a process for measuring and regulating the drying of wet products within a drier and which comprises comparing the rate of the actual shrinkage of a specimen product, also being dried, with the rate of the predetermined shrinkage, and modifying the flow or supply of a gaseous drying fluid in accordance with the differences between the two rates.

According to one method of carrying out the invention, two differences of electric potential are created which vary proportionately with the two rates of shrinkage, these differences of potential are compared so as to create an electric control current which is a function of the differences between said differences of potential, and this current is utilized for varying the flow or supply of the drying fluid.

A further object of the present invention is to provide a measuring and regulating device which is adapted to apply said process and comprises in combination with an adjustable device controlling the supply or flow of a drying fluid: a shrinkage measuring device including two members to which a relative movement is imparted under the effect of the shrinkage of a specimen product in the course of drying, a first potentiometer whose resistance and slider are connected respectively to one and the other of said means, a second potentiometer, a programme cam continuously rotated and connected to the movable element of this potentiometer, the profile of this cam corresponding to the predetermined shrinkage rate, a source of electricity feeding these potentiometers, a comparator for comparing the voltages created in the two potentiometers and for producing a current which is proportional to the difference between these voltages, and electromechanical means subjected to the action of said current for regulating said device controlling the flow of drying fluid.

Preferably, the comparing device comprises a Wheatstone bridge in two adjacent branches of which are disposed the two potentiometers, the source of electricity being disposed in one of the diagonals of the bridge whereas an electromagnetic comparator device connects, in another diagonal of the bridge, the sliders of the two potentiometers.

Another object of the present invention is to provide a shrinkage measuring device which is adapted to be used in the above-mentioned measuring and regulating device and in which said movable members comprise a box and a rack movable in this box each of these members being provided with a point adapted to be pressed into the specimen product at a certain starting distance from the other point, the box carrying the resistance of the potentiometer and the rack being connected to its slider.

A further object of the present invention is to provide a drum drier or a drier having heating chambers or a heating base, provided with a regulating device of the above-mentioned type.

Further features and advantages of the invention will appear from the ensuing description.

In the accompanying drawings, given merely by way of example:

Fig. 7 is a diagrammatic vertical sectional view of a drying tunnel equipped with the regulating device of the invention;

Fig. 8 is a plan view of the cable winding drum adapted to connect the shrinkage measuring device carried by one of the trucks movable in the tunnel to the compartment containing the rest of the electromechanical devices;

Fig. 9 is a vertical diagrammatic sectional view of a drier of the chamber type equipped with the regulating device of the invention, and Fig. 10 is a similar view of a drier having a heated base equipped with the same device.

Figure 1:
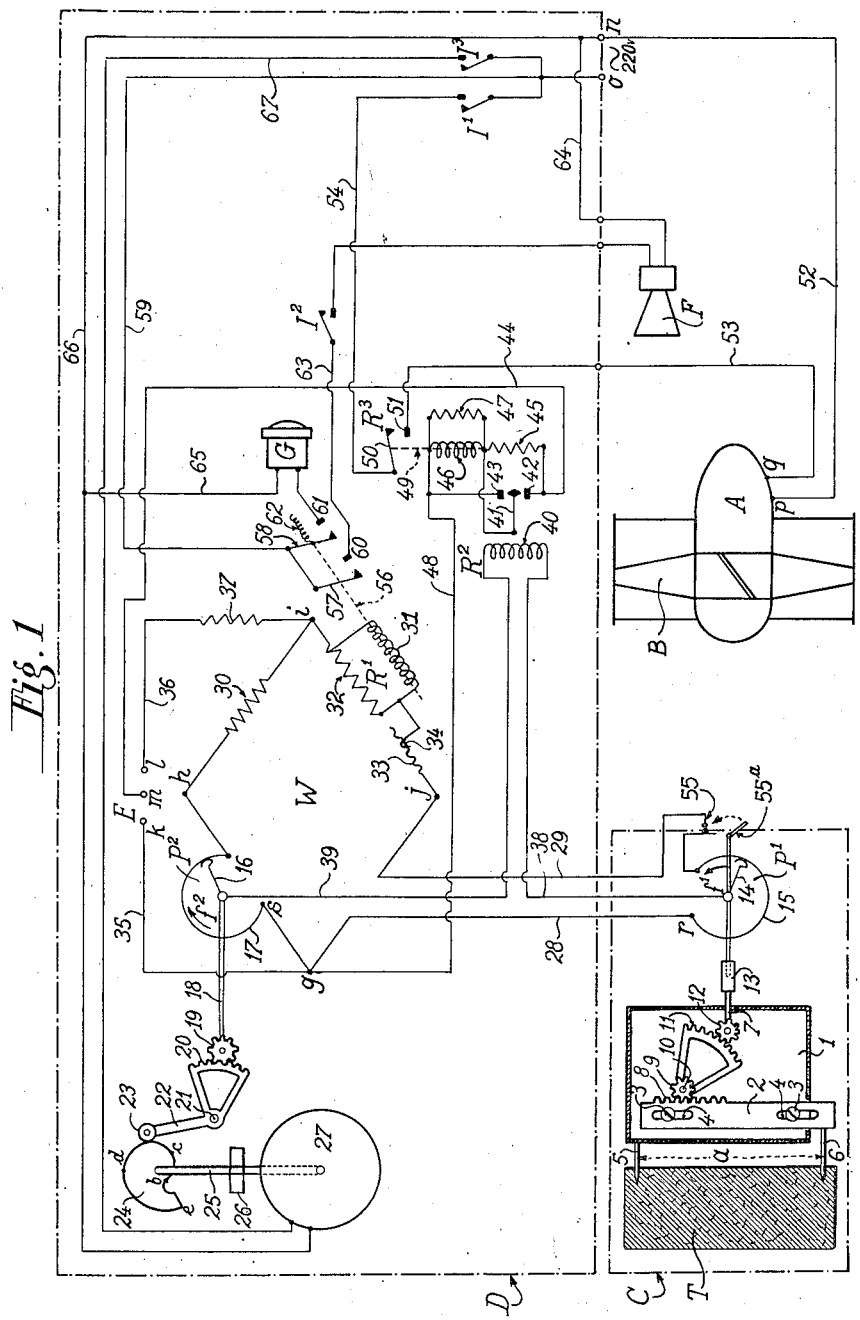
Fig. 1 is a diagram of a drying measuring and regulating device embodying the present invention.

Referring firstly to the diagram shown in Fig. 1, which represents the layout of the measuring and regulating device of the invention, this device is adapted to regulate the electric supply for the electric motor A of a fan B adapted to deliver the drying fluid (air or other gas). It comprises the combination of a shrinkage measuring device C and a certain number of electromechanical elements and other elements disposed in a compartment generally designated D.

The shrinkage measuring device C is adapted to modify an electric resistance in accordance with the shrinkages of a specimen product T which is exposed to the drying fluid together with the other products to be dried.

This shrinkage measuring device C comprises a housing 1 and a rack 2 extending and movable through the latter. This rack 2 is guided by members 3 which extend through slots 4 formed in this rack. The housing 1 carries a first point 5 adapted to be pressed into the wet or moist specimen T, which is identical as concerns nature, dimensions and form, to the articles to be dried. The rack 2 carries another point 6 which is adapted to be pressed into this specimen at a starting or initial distance $a$ from the point 5. The rack 2 is connected to a shaft 7 through a step-up gearing comprising gear teeth 8 formed on the rack, a gear pinion 9 engaged with these teeth and keyed for rotational movement with a pin 10 rigid with a sector 11, and a gear pinion 12 which engages gear teeth formed on the sector 11 and is rigidly connected to the shaft 7. The latter is connected through a friction coupling 13 to the slider 14, which is moved along the coiled resistance 15 of a potentiometer $P^1$.

As can be seen, when the specimen T dries and shrinks, the points 5 and 6 approach one another and the slider 14 of the potentiometer rotates in the direction of arrow $f^1$.

Disposed inside the compartment D is another potentiometer $P^2$ whose slider 16, which is movable along the resistance 17 in the direction of arrow $f^2$, is rigidly connected, through a shaft 18, to a gear pinion 19 which engages a toothed sector 20. The latter is rotatably mounted on a fixed spindle 21 and is rigid with an arm 22. This arm 22 carries a roller 23 which co-operates with a cam 24 keyed to a shaft 25 of a step-down mechanism 26 connected to an electric synchronous motor 27, this step-down mechanism being so arranged that the cam 24 effects, for example, one rotation in 48 hours.

Figure 6:
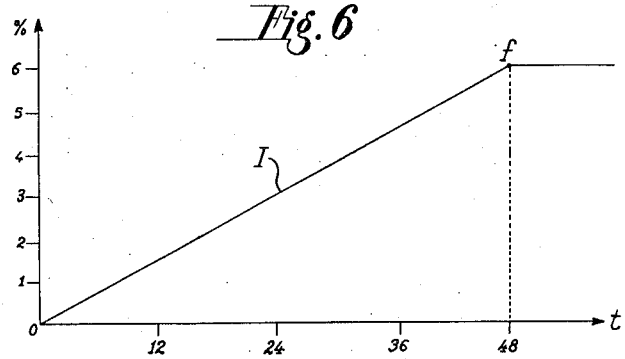
Fig. 6 is a graph representing the drying programme as a function of time, the latter being marked out as abscissae, the ordinates corresponding to the percentage of shrinkage, this graph being intended for determining the profile of the programme cam.

The operative profile $b, c, d, e$ of the cam is so arranged that the position of the slider 16 relative to the resistance 17 of the potentiometer $P^2$ varies with respect to time proportionately with the shrinkage programme. The curve I (Fig. 6) represents such a programme. The time in hours has been marked off as abscissae along $Ot$ and the percentage shrinkage values have been marked off as ordinates. In the illustrated example the portion $Of$ of the curve I is rectilinear, which signifies that the shrinkage must be proportional to time. In this case the portion $b, c, d, e$ of the cam 24 corresponds substantially to an archimedean spiral.

The resistances 15 and 17 of the two potentiometers $P^1$ and $P^2$ are inserted in the two adjoining branches $gh$ and $gj$ of a Wheatstone bridge, the resistance 17 being connected directly and the resistance 15 through two conductors 28 and 29. Disposed in the branch $hi$ of the bridge is a fixed resistance 30, and the branch $ij$ includes the coil 31 of a relay $R^1$, shunted by a fixed resistance 32, and a resistance 33 which is adjustable by means of a movable slider 34 and is adapted to equalize the branches $hi$ and $ji$ of the bridge.

A source of electric power E, for example of the order of 40 volts across its extreme terminals $k$ and $l$, is connected, on one side, directly by a conductor 35 and, on the other side, by a conductor 36 through a resistance 37, to the apices $g$ and $i$ of the bridge and thus forms one of the diagonals of the bridge.

The other diagonal of the bridge connects the sliders 14 and 16 of the potentiometers $P^1$, $P^2$, through conductors 38 and 39 and the winding 40 of the galvanometer relay $R^2$.

As will be understood, the electric current in this relay is zero when the two sliders 14 and 16 occupy on the resistances 15 and 17 appropriate relative positions, whereas a current is carried by this winding 40 in one direction or the other as soon as the slider 14 of the potentiometer $P^1$ lags or leads with respect to the predetermined shrinkage corresponding to the profile of the cam 24.

The winding 40 of the relay $R^2$ carries currents which are too weak for directly insuring the operation of the motor A of the fan B. This relay $R^2$ is therefore combined with a more powerful relay $R^3$.

The winding 40 controls the blade 41 of a switch having two studs 42 and 43 which are disposed in such manner that the blade 41 enters into contact with the stud 42 when the slider 14 of the potentiometer $P^1$ is lagging with respect to the slider 16 of the potentiometer $P^2$ (owing to an actual shrinkage which is too small, at the considered instant, with respect to the estimated shrinkage) or in synchronism with said slider 16, the blade 41 entering into contact with the stud 43 when the slider 14 is leading with respect to the slider 16 as a result of the actual shrinkage being too rapid.

The stud 42 is connected, firstly, by a conductor 44 to an intermediate terminal $m$ of the source E and, secondly, to one end of a resistance 45 whose other end is connected to the blade 41 and to one of the ends of a shunt comprising the winding 46 of the relay $R^3$ and a resistance 47. The other end of the shunt 46, 47 is connected, firstly, to the stud 43 and, secondly, through a conductor 48 to the terminal $k$ of the source E.

It can be seen that when the blade 41 is on the stud 42, the circuit is closed, across the winding 46 and across the resistance 47, by the following circuit: terminal $k$, conductors 35 and 48, shunt 46, 47, blade 41, stud 42, conductor 44 and terminal $m$.

The winding 46 is then energized and acts, through the medium of its armature, on the blade 50 of the relay $R^3$ and brings this blade onto the stud 51 supplying the motor A. When the blade 41 is on the stud 43, the current is cut off in the winding 46 and the switch 50, 51 of the relay $R^3$ is opened. The current then passes through the resistance 45 in the following circuit: terminal $k$, conductors 35 and 48, stud 43, blade 41, resistance 45, conductor 44 and terminal $m$. The resistance 47 and the winding 46 are short-circuited by the switch 41, 43; one or other of these circuits is therefore always closed so that sparks are avoided when breaking the circuit.

The compartment D has two terminals $n$ and $o$ adapted to connect a source of alternating current, for example 220 volts. The motor A is connected to this source in the following manner: a first conductor 52 connects the terminal $n$ to one of the terminals $p$ of the motor, whereas the other terminal $q$ of this motor is connected by a conductor 53 to the stud 51 of the relay $R^3$; the blade 50 is connected by a conductor 54 through a switch $I^1$ which stops or starts up the regulation at the terminal $o$ of the mains supply. The motor A is therefore supplied with current each time the switch 50, 51 is closed, i. e. each time the slider 14 of the potentiometer $P^1$ is lagging with respect to the slider 16 of the potentiometer $P^2$, or in other words, each time the actual shrinkage is lagging with respect to the estimated shrinkage.

It will be observed that interposed between the resistance 15 of the potentiometer $P^1$ and the conductor 29, is a switch 55 which is opened by a blade $55^a$ rigid with the shaft of the potentiometer and therefore with the slider 14, at the end of the travel. Further, the relay $R^1$ is adapted to signal the opening of this switch 55, and, in a general way, if this switch is still closed, any cessation of current in the potentiometer $P^1$ (one reason for this will be explained hereinunder).

To this end, the coil 31 of the relay $R^1$, which carries the current passing through the potentiometer $P^1$, controls by way of its armature 56 two blades 57 and 58 which are directly connected by a conductor 59 to the terminal $o$ of the mains supply. These blades are adapted to cooperate with a stud 60 and a stud 61 respectively. These blades are urged onto these studs by means of a spring 62 when the current is no longer in the winding 31.

The stud 60 controls the power supply to a sound device F, this stud being connected, by a conductor 63 through a switch 12, to one of the terminals of this device, the other terminal of the latter being connected by a conductor 64 to the terminal m of the mains supply.

The stud 61 controls the power supply to a light signal device G whose circuit is established, firstly, in respect of the terminal o, by the conductor 59 and the blade 58, and, secondly, in respect of the terminal n, by conductors 65 and 66.

It will be observed that the motor 27 driving the cam 24 is connected to the terminals n and o firstly by the conductor 56 and, secondly, by a conductor 67. A switch I³ for stopping the cam 24 is disposed in this conductor 67.

The operation of the apparatus is as follows:

When commencing a drying operation, the two points 5 and 6 of the shrinkage measuring device C are pressed into the specimen product T at a distance a from one another. The sliders 14 and 16 of the potentiometers are at positions r and s.

The motor 27 is started up by closing the switch I³. The slider 16 rotates in a regular manner owing to the action of the motor 27 whereas the slider 14 of the potentiometer P¹ is caused to rotate under the action of the shrinkage of the specimen T.

So long as the slider 14 does not lead with respect to the slider 16, the actual shrinkage being less or at the most equal to the estimated shrinkage, the current in the diagonal of the bridge, including the conductors 38 and 39 and the winding 40, maintains the blade 41 on the stud 42. The winding 46 maintains the switch 50, 51 of the relay R³ closed and the motor A of the fan B is supplied. The latter delivers the drying fluid. The supply of this fluid is stopped as soon as the shrinkage becomes excessive, because when this occurs the slider 14 leads with respect to the slider 16 and this reverses the position of the blade 41. The current controlled by the winding 40 then passes through the resistance 45, the winding 46 is no longer supplied, the switch 50, 51 opens and the motor A is temporarily stopped.

The fan B thus supplies drying fluid either at full rate or not at all until the end of the drying operation, or at least until the time when the drying is sufficiently advanced to be no longer critical, i. e., until the instant when the blade 55ª, associated with the relative displacement of the points 5 and 6, opens the switch 55. This instant is indicated by the sound and light devices F and G, for the current is cut off in the winding 31 of the relay R¹ and the blades 57 and 58 urged by the spring 62 enter into contact with the studs 60 and 61 supplying current to these devices F and G.

Figure 2:
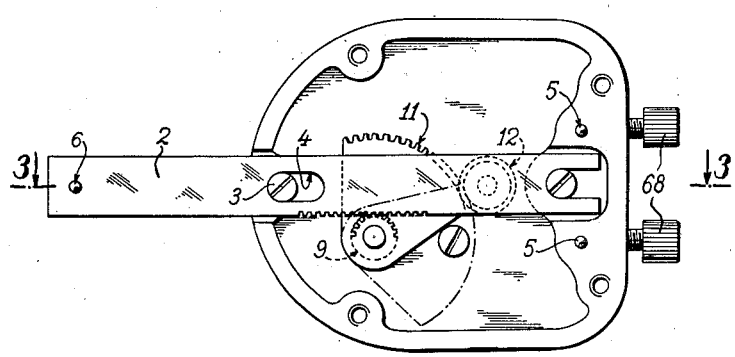
Fig. 2 is a bottom view of a preferred embodiment of the shrinkage measuring device forming part of this regulating device.
Figure 3:
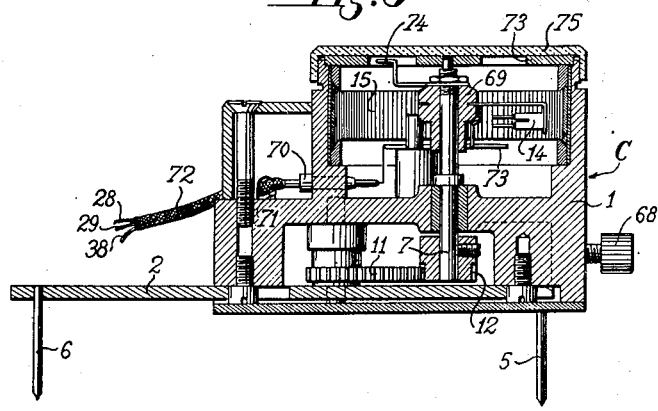
Fig. 3 is a longitudinal sectional view taken on line 3—3 of Fig. 2.

Reference will now be had to Figs. 2 and 3 which show a practical embodiment of the shrinkage measuring device C. Previously described elements are to be found in this device, notably: the housing 1 in which the rack 2 is slidable and guided by screws 3, this rack carrying the point 6, the housing 1 being provided with a pair of points 5 which are equi-distant from the point 6 and are detachable, these points being held fast by screws 68, the pinion 8, the toothed sector 11, the gear pinion 12 and the shaft 7. The latter drives by means of friction a hub 69 carrying the slider 14. The resistance 15 of the potentiometer is carried by the housing 1.

This resistance 15 is of metal or alloy which is insensitive to the variations in temperature in the drier. For example, it may be of one or other of the following two alloys:

"Cupron" whose composition is:

| | Percent |
|---|---|
| Nickel | 45 |
| Copper | 35 | and whose coefficient of temperature between 20° and 100° C. is 0.00002;

"Manganin" whose composition is:

| | Percent |
|---|---|
| Copper | 84 |
| Manganese | 12 |
| Nickel | 4 | and whose coefficient of temperature between 20° and 100° C. is 0.00015.

The ends of the resistance 15 terminate in two terminals such as those shown at 70 in Fig. 3.

It will be noticed that the slider 14 is connected to the conductor 38 in the known manner by means of a spiral spring 73.

The three conductors 28, 29 and 38 (Fig. 1) issue from the apparatus through the opening 71 in the housing and are united within a sheath 72 in the form of a cable.

Preferably, the housing 1 comprises a dial 73 in front of which moves a pointer 74 which is rigid with the shaft 7 and indicates at each instant the value of the shrinkage. The dial 73 is covered by a transparent cover 75.

Figure 4:
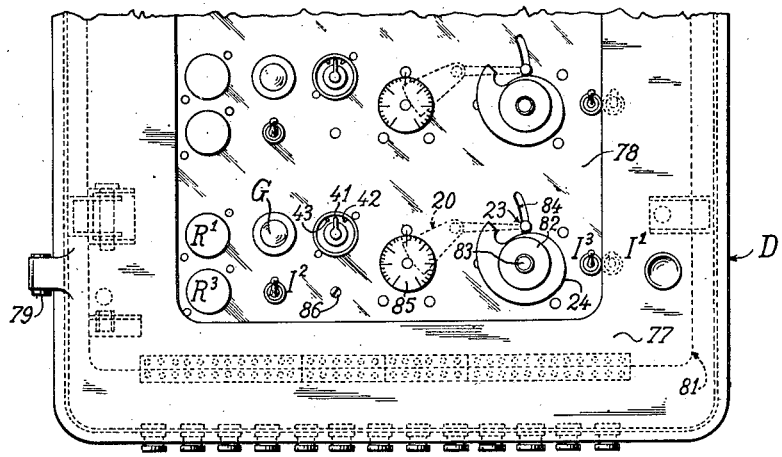
Fig. 4 is a partial elevational view of a compartment containing the various electromechanical elements of the device, with the exception of the shrinkage measuring device.
Figure 5:
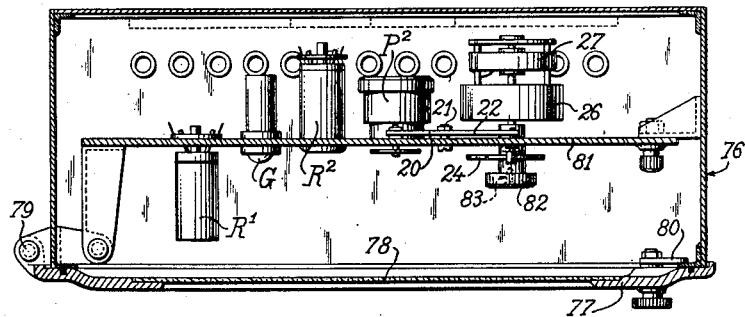
Fig. 5 is a sectional view taken on line 5—5 of Fig. 4.

Reference will now be had to Figs. 4 and 5, which show the lower portion and the horizontal section, respectively, of one embodiment of the compartment D containing the equipment shown in Fig. 1, with the exception of the shrinkage measuring device C, the fan B and the sound signal device F.

This compartment receives several apparatus pertaining to several drying installations and comprises a case 76 provided on the front side with a door 77 which includes a window 78 and is pivotably mounted on hinges 79. A closing device 80 for this door is provided.

Disposed inside the compartment is a vertical wall 81 on which are supported the various parts described above. For each measuring and regulating device, there are, starting from the right as viewed in Figs. 4 and 5: the switch I¹ controlling the fan and the switch I³ controlling the motor 27 which rotates the programme cam, and then this motor 27 with its reducing gear 26. This motor and reducing gear are placed behind the plate 81 and disposed in front of the latter is the cam 28 which is fixed on the end of the output shaft of the reducing gear by means of a knob 82 and a screw 83. Resting on this cam 24 is the roller 23 whose spindle traverses the wall 81 through an elongated slot 84 (Fig. 4). Disposed on the rear face of the wall is the lever 20, 22 which is journalled in this wall by means of a spindle 21.

The potentiometer P² supplied by the mains supply line 20 is disposed on the rear face of the wall 81 through which it extends so as to present on the front side thereof a graduated dial 85 indicating at any instant the value of the estimated shrinkage.

Adjacent the potentiometer P², the wall 81 carries the relay R² the contact blade 41 of which is seen on the front side of the wall 81, this blade cooperating with the studs 42 and 43.

Journalled in the wall 81, below this relay R², is a screw 86 which adjusts the regulating resistance 33 of the Wheatstone bridge. A little more to the left, the wall 81 carries the window of the light signal device G and, below the latter, the switch I² of the sound signal device F. Lastly, to the left of the latter, the wall 81 carries the relays R¹ and R³.

Reference will now be had to Figs. 7 and 8, which relate to the application of the invention to a tunnel type drier. In this tunnel 87, trucks 88 travel in the direction of arrow f³ from an entrance, ordinarily closed by a curtain 89, to an exit station, where the trucks are received by a transporting band 90 moving in a direction perpendicular to the plane of Fig. 7.

The trucks 88 carry shelves on which are disposed the products to be dried. The drying fluid, which is adapted to carry away water vapour from these products and, if required, bring the latter to the desired temperature, is air which circulates in the opposite direction to the movement of the trucks, i. e. from the right to the left as viewed in Fig. 7. It is blown through the tunnel drier by a first fan 91 which forces it through a nest of heating tubes 92 which is supplied with steam or other heating fluid through a pipe 93 controlled, in an automatic manner or otherwise, by a valve 94. The partially cooled heating fluid issues from this heater through the pipe 95.

In practice, the fan 91 is not sufficient to ensure circulation of the fluid through the tunnel, this circulation being ensured by a second, suction fan B placed at the end adjacent the entrance of the trucks. This fan B is driven by the motor A the power supply to which is controlled in the above-described manner. This fan B draws, through the aperture 96 and the tunnel, the air laden with the water vapour and discharges it through the aperture 97.

With such an installation, the drier receives every morning a number of trucks corresponding to a half-loaded tunnel; these trucks are withdrawn after having been in the drier 48 hours. For each loading, i. e., every morning, a shrinkage measuring device C is placed on a specimen product carried by the first truck put into the tunnel.

The cable issuing from this shrinkage measuring device comprises three sections 72, 72$^a$ and 72$^b$ comprising sections 28, 29, 38, 28$^a$, 29$^a$, 38$^a$; and 28$^b$, 29$^b$, 38$^b$, respectively, of the three conductors connecting the shrinkage measuring device to the Wheatstone bridge in the compartment D. The conductor sections of the section 72 of the cable lead to three sockets 98 carried by an insulating plate 100 which is fixed, by a mild steel strip 100$^a$ and a screw 100$^b$, on a part of the truck carrying the shrinkage measuring device. Engaged in these sockets are plugs 101 carried by the conductor sections of the section 72$^a$ of the cable.

In order to avoid an untimely withdrawal of the plugs 101 while the section 72$^a$ of the cable is not yet taut, there is fixed on this section, by means of a metal attachment 102 and a connector 103, a permanent magnet 104 which forms a retainer owing to its adherence to the strip 100$^a$ fixed to the truck.

The section 72$^a$ is wound round a reel 105 from which it is unwound as the truck advances. This reel comprises two flanges 106, one of which carries three concentric conductive rings 108 (seen in section in Fig. 8) insulated from this flange. These rings are connected to the conductor sections 28$^a$, 29$^a$, 38$^a$ respectively by brushes 109 which rub against the rings.

As will be understood, with such an arrangement the connection of the shrinkage measuring device C and the compartment D is ensured so long as the section 72$^a$ is not fully extended, since the magnet 104 prevents any premature withdrawal of the plugs. On the other hand, as soon as the truck T has caused the complete unwinding of the section 72$^a$, the plugs 101 are automatically withdrawn from the sockets 98. The potentiometer P$^1$ (Fig. 1) is disconnected, the current is cut off in the winding 31 of the relay R$^1$, the light and sound signal devices F and G are supplied with current and indicate to the operators in charge of the drying oven that it is time to connect, after rewinding the section 72$^a$, the latter to the section 72 pertaining to a new shrinkage measuring device positioned on one of the new trucks introduced in the oven.

In Fig. 9 the invention is shown applied to a drier constituted by a construction 110 divided into a number of superposed chambers 111 by perforated walls 112 on which the products S to be dried are disposed. The air for extracting the water vapour is blown through a conduit 113 by a fan B. The motor A for this fan is controlled by the devices in the compartment D and by the shrinkage measuring device C placed on a specimen product T. The air laden with water vapour leaves the lower end of the drier through a tunnel 114.

Fig. 10 shows a drier 115 which has a heated base 119 through which passes a heating fluid which enters the base at 117 and leaves through a chimney 118. The products to be dried S$^1$ are piled on the base 119 and the air for carrying away the water vapour is blown into the drier by a fan B whose motor A is controlled, in accordance with the invention, by the unit comprising the compartment D and the shrinkage measuring device C placed on one of the products to be dried or on a specimen product. The air enters the heating chamber through upper apertures 102 and escapes together with the water vapour through an opening 121.

Although specific embodiments of the invention have been described and illustrated, it must be understood that the invention is not limited thereto, since many changes and modifications may be made therein without departing from the spirit of the invention or the scope of the appended claims.

Having now described my invention, what I claim as new and desire to secure by Letters Patent is:

1. Device for measuring and regulating the drying of wet products inside a drier, the drying being effected by a gaseous drying fluid, this device comprising in combination with adjustable control means for the flow of the drying fluid: a shrinkage measuring device provided with two elements to which is imparted a relative movement under the action of the shrinkage of a specimen product in the course of drying, a first potentiometer whose resistance and slider are connected respectively to one and the other of said elements; a second potentiometer; a programme cam which is driven in rotation continuously and is connected to the slider of said second potentiometer, the profile of this cam corresponding to a predetermined shrinkage rate; a source of electricity supplying said potentiometers; comparator means for comparing the voltages created in the two potentiometers and producing a current which is proportional to the difference between these voltages; and electro-mechanical means subjected to the action of said current for adjusting said control means for the flow of the drying fluid in accordance with said current.

2. Device for measuring and regulating the drying of wet products inside a drier, the drying being effected by a gaseous drying fluid, this device comprising in combination with adjustable control means for the flow of the drying fluid: a shrinkage measuring device provided with two elements to which is imparted a relative movement under the action of the shrinkage of a specimen product in the course of drying, a first potentiometer whose resistance and slider are connected respectively to one and the other of said elements; a second potentiometer; a programme cam which is driven in rotation continuously and is connected to the slider of said second potentiometer, the profile of this cam corresponding to a predetermined shrinkage rate; a source of electricity supplying said potentiometers; comparator means for comparing the voltages created in the two potentiometers and producing a current which is proportional to the difference between these voltages, said comparator means comprising in combination: a Wheatstone bridge in the two adjacent branches of which are disposed the two potentiometers, said electric source being placed in one of the diagonals of said bridge; an electro-magnetic comparator device connecting, through another diagonal of said bridge, the sliders of the two potentiometers in such manner that this device carries said current; and electro-mechanical means subjected to the action of said current for adjusting said control means for the flow of the drying fluid in accordance with said current.

3. Device as claimed in claim 2, wherein said adjusting means for the control of the flow of the drying fluid are electro-mechanical and said electromagnetic device comprises in combination: a first galvanometer relay including a winding connected to the sliders of the potentiometers and a switch having two studs and a blade actuated by said winding, and a second relay, more powerful than the first relay, which has a winding controlled by said studs and a switch which is actuated by the latter winding and is disposed in the supply circuit for said electro-mechanical adjusting means for the flow of the drying fluid.

4. Device as claimed in claim 3, wherein said electro-mechanical means for controlling the flow of the drying fluid comprise a fan, an electric motor for rotating the latter, and a supply circuit for this motor in which is disposed the switch for said second relay.

5. Device as claimed in claim 2, including an adjustable variable resistance in one of the branches of the bridge.

6. Device as claimed in claim 2, further comprising at least one electric signal device and a winding of an auxiliary relay disposed in said branch of said bridge which includes the potentiometer actuated by the shrinkage measuring device, this relay controlling the circuit of said signal device in such manner that the latter is supplied with current and provides a signal when the current in said potentiometer is zero, that is either when the slider of this potentiometer has assumed the position corresponding to a given shrinkage or when the circuit connecting said potentiometer is opened.

7. Device as claimed in claim 6, comprising an electric sound signal device and an electric light signal device, the supply circuits for the signal devices being connected in parallel and controlled by said auxiliary relay.

8. Device as claimed in claim 2, comprising a casing in which is housed the unit comprising this device with the exception of said shrinkage measuring device.

9. Drier for wet products provided with a measuring and regulating device according to claim 2.

10. Drier for wet products, said drier comprising a tunnel, trucks movable in this tunnel for moving said products between an entrance aperture and an exit aperture formed in said tunnel; adjustable electromechanical means for controlling the flow of a drying fluid through said tunnel; a shrinkage measuring device disposed on one of said trucks and comprising two members to which is imparted a relative movement under the action of the shrinkage of a specimen product in the course of drying, this specimen product being carried by said truck, and a first potentiometer whose resistance and slider are connected respectively to one and the other of said members; disposed outside said tunnel, an electromechanical unit comprising a second potentiometer, a programme cam which is driven in continuous rotation and connected to the slider of the second potentiometer and whose profile corresponds to the predetermined shrinkage rate, a source of electricity feeding these potentiometers, comparator means for comparing the voltages created in the two potentiometers and for producing a current proportional to the difference between these voltages and electromechanical means subjected to the action of said current for adjusting said electromechanical control means for the flow of the drying fluid in accordance with said current; and electric connecting devices for connecting to said electromechanical unit the shrinkage measuring device and said electromechanical adjusting means for the flow of the drying fluid.

11. Drier as claimed in claim 10, further comprising: an insulating plate provided with connecting members and carried by the truck which carries the shrinkage measuring device; means for unrolling a cable comprising a reel mounted for rotation about a fixed axis in said tunnel, conductive insulated rings coaxial with said axis and carried by one of the cheeks of said reel, and fixed brushes rubbing on said rings; and a connecting cable having three sections, a forward section, an intermediate section, and a rear section for connecting said shrinkage measuring device to the electromechanical unit disposed outside the tunnel, the conductors of the forward section being disposed in the tunnel and connecting the shrinkage measuring device to said connecting members carried by said insulating plate, the intermediate section, which is also disposed in the tunnel, being wound round said reel and each one of its conductors being connected by one of its ends to one of said conductive rings and being provided at its other end with an additional connecting member complementary to one of those connecting members carried by said insulating plate for the purpose of connecting this conductor to one of the conductors of the forward section, and the rear section emerging from the tunnel and each of its conductors being connected at one end to one of said brushes and at the other end to said electromechanical unit.

12. Drier as claimed in claim 11, comprising retaining means for preventing the disconnection of said connecting members between said forward and intermediate sections of the cable so long as the tractive disconnecting force is less than a given value.

13. Drier as claimed in claim 12, wherein said retaining means comprise in combination: a metal plate carried by said truck, a permanent magnet applied to this plate and a connection connecting said magnet to said intermediate section of the cable.

14. Drier for wet products, said drier comprising at least one chamber in which said products are disposed, electromechanical means for circulating in these chambers a drying fluid, a shrinkage measuring device disposed in this chamber and comprising two elements to which is imparted a relative movement under the action of the shrinkage of a specimen product in the course of drying, and a first potentiometer whose resistance and slider are connected respectively to one and the other of said elements; disposed outside the chamber, an electromechanical unit comprising a second potentiometer, a programme cam which is driven in continuous rotation and connected to the slider of the second potentiometer and whose profile corresponds to the predetermined shrinkage rate, a source of electricity feeding these potentiometers, comparator means for comparing the voltages created in the two potentiometers and for producing a current proportional to the difference between these voltages and electromechanical means subjected to the action of said current for adjusting said electromechanical control means whereby the flow of the drying fluid varies in accordance with said current; and electric connecting devices for connecting to said electromechanical unit said shrinkage measuring device and said electromechanical adjusting means.

15. Drier as claimed in claim 14, comprising tiers of chambers, said fluid being for both drying and bringing the products to a certain temperature.

16. Drier as claimed in claim 15, comprising a heating base, said fluid merely performing the function of a vehicle for the water vapour withdrawn from the products.

References Cited in the file of this patent

UNITED STATES PATENTS

| | | |
|---|---|---|
| 1,773,114 | Mueller | Aug. 19, 1930 |
| 2,589,597 | Baak | Nov. 18, 1952 |

FOREIGN PATENTS

| | | |
|---|---|---|
| 170,161 | Switzerland | Sept. 17, 1934 |